United States Patent [19]

Isozaki et al.

[11] Patent Number: 4,895,910

[45] Date of Patent: * Jan. 23, 1990

[54] RESIN COMPOSITION CURABLE AT LOW TEMPERATURE

[75] Inventors: Osamu Isozaki, Yokohama; Noboru Nakai, Hiratsuka, both of Japan

[73] Assignee: Kansai Paint Company, Limited, Amagasaki, Japan

[*] Notice: The portion of the term of this patent subsequent to Sep. 20, 2005 has been disclaimed.

[21] Appl. No.: 161,822

[22] Filed: Feb. 29, 1988

[30] Foreign Application Priority Data

Mar. 9, 1987 [JP] Japan .................................. 62-53662

[51] Int. Cl.$^4$ .............................................. C08F 24/00
[52] U.S. Cl. .............................. 525/326.5; 525/327.3; 525/370; 525/479; 526/268; 526/279; 528/27
[58] Field of Search .............................. 526/268, 279; 525/326.5, 327.3, 370, 479, 273; 528/27

[56] References Cited

U.S. PATENT DOCUMENTS

| | | | |
|---|---|---|---|
| 3,242,145 | 3/1966 | Martin | 526/268 |
| 4,180,619 | 12/1979 | Makhlouf et al. | 526/273 |
| 4,478,990 | 10/1984 | Kohno et al. | 526/279 |
| 4,564,557 | 1/1986 | Ohgushi et al. | 526/279 |
| 4,772,672 | 9/1988 | Isozaki | 526/273 |

FOREIGN PATENT DOCUMENTS

| | | | |
|---|---|---|---|
| 58-52350 | 3/1983 | Japan | 528/27 |
| 61-78878 | 4/1986 | Japan | 528/27 |

*Primary Examiner*—John C. Bleutge
*Assistant Examiner*—R. Dean, Jr.
*Attorney, Agent, or Firm*—Armstrong, Nikaido, Marmelstein, Kubovcik & Murray

[57] ABSTRACT

This invention provides a resin composition curable at a low temperature and characterized in that the composition comprises:

(a) a copolymer prepared from a polysiloxane macromonomer and an epoxy-containing monomer both containing ethylenically unsaturated groups, the polysiloxane macromonomer being prepared by reacting 70 to 99.999 mole % of a compound (A) represented by the formula

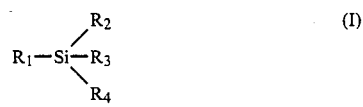

wherein $R_1$ is an aliphatic hydrocarbon group having 1 to 8 carbon atoms or phenyl, and $R_2$, $R_3$ and $R_4$ are each alkoxyl having 1 to 4 carbon atoms or hydroxyl with 30 to 0.001 mole % of a compound (B) represented by the formula

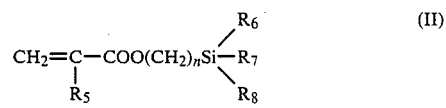

wherein $R_5$ is a hydrogen atom or methyl, $R_6$, $R_7$ and $R_8$ are each hydroxyl, alkoxyl having 1 to 4 carbon atoms or an aliphatic hydrocarbon group having 1 to 8 carbon atoms, at least one of $R_6$, $R_7$ and $R_8$ being hydroxyl or alkoxyl, and n is an integer of 1 to 6, the polysiloxane macromonomer having per molecule at least two functional groups selected from hydroxyl and the alkoxyl and being 400 to 100000 in number average molecular weight, the epoxy-containing monomer having at its terminal end the group

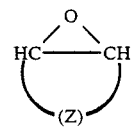

wherein (Z) forms an alicyclic group with the C—C bond, and (b) a 6-coordinate organoaluminum chelate compound and/or an 8-coordinate organozirconium chelate compound.

14 Claims, No Drawings

RESIN COMPOSITION CURABLE AT LOW TEMPERATURE

The present invention relates to resin compositions which are curable at low temperatures.

For energy cost reductions, it has been highly desired to develop resin compositions which are curable at low temperatures.

Heretofore chiefly used as low-temperature curable resin compositions are two-package resin compositions such as polyol/isocyanate, epoxy/polyamine and like compositions. These two-package resin compositions are cumbersome to handle since the components of the composition are separately stored in two packages and mixed together immediately before use. Moreover, those comprising an isocyanate have the drawback of being highly toxic.

On the other hand, single-package resin compositions are known which are curable at low temperatures. Unexamined Japanese Patent Publication No. 67553/1985, for example, discloses a composition comprising aluminum chelate compound and a vinyl polymer containing as a monomer component an alkoxysilane compound such as methacryloxypropyltrimethoxysilane. With this composition, the silanol group resulting from the hydrolysis of the alkoxysilane group primarily serves as a crosslinking functional group, so that there arises a need to use a large quantity of water for the hydrolysis of alkoxysilane groups if it is desired to obtain a cured product with sufficient hardness. Consequently, the hydrolysis produces large quantities of alcohol, etc. as by-products, which render the cured product rough-surfaced, hence impairing surface smoothness. Further when the cured only with the water in air, this composition requires a prolonged period of time for curing and encounters difficulty in completely curing within the interior of the composition since curing proceeds from the surface, and thus exhibiting lower hardness. Another problem is experienced in that the cured product is prone to shrinkage and is inferior in surface smoothness.

Polymerizable unsaturated resin compositions of the single-package type are also known which are curable with the active energy of ultraviolet rays, electron rays or the like. These compositions have the drawback of necessitating ah irradiation device.

An object of the present invention is to provide a single-package resin composition which is readily curable by crosslinking at a low temperature when merely allowed to stand in air and which is easy to handle.

Another object of the invention is to provide a resin composition which is curable with lesser quantities of by-products to give a cured product of satisfactory properties. Still another object of the invention is to provide a resin composition which is curable generally uniformly with a reduced difference between the surface and the interior when applied, giving a cured product having sufficient hardness and yet almost free of shrinkage.

These and other objects and features of the invention will become apparent from the following description.

The present invention provides a resin composition curable at a low temperature and characterized in that the composition comprises:

(a) a copolymer prepared from a polysiloxane macromonomer and an epoxy-containing monomer both containing ethylenically unsaturated groups, the polysiloxane macromonomer being prepared by reacting 70 to 99.999 mole % of a compound (A) represented by the formula

wherein $R_1$ is an aliphatic hydrocarbon group having 1 to 8 carbon atoms or phenyl, and $R_2$, $R_3$ and $R_4$ are each alkoxyl having 1 to 4 carbon atoms or hydroxyl with 30 to 0.001 mole % of a compound (B) represented by the formula

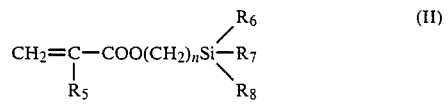

wherein $R_5$ is a hydrogen atom or methyl, $R_6$, $R_7$ and $R_8$ are each hydroxyl, alkoxyl having 1 to 4 carbon atoms or an aliphatic hydrocarbon group having 1 to 8 carbon atoms, at least one of $R_6$, $R_7$ and $R_8$ being hydroxyl or alkoxyl, and n is an integer of 1 to 6, the polysiloxane macromonomer having per molecule at least two functional groups selected from hydroxyl and the alkoxyl and being 400 to 100000 in number average molecular weight, the epoxy-containing vinyl monomer having at its terminal end the group

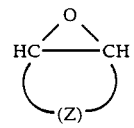

wherein (Z) forms an alicyclic group along with the C—C bond (the epoxy-containing monomer will hereinafter be referred to as "alicyclic expoxy-containing monomer"), and (b) a 6-coordinate organoaluminum chelate compound and/or an 8-coordinate organozirconium chelate compound.

With the copolymer serving as the resin component of the present resin composition, the silanol group derived from the polysiloxane macromonomer used as one of the monomer components, and the epoxy group derived from the alicyclic epoxy-containing monomer serving as the other monomer component act as the main crosslinking functional groups. Further when the macromonomer has alkoxyl, the alkoxyl group forms silanol when hydrolyzed with the water in air. The silanol group then serves as a crosslinking functional group.

In the present resin composition having such crosslinking functional groups, the chelating agent vaporizes from the organoaluminum chelate compound and/or the organozirconium chelate compound serving as a crosslinking agent, whereby crosslinking curing is initiated at a low temperature and presumably there concurrently occur various curing reactions given below.

(A) Condensation between silanol groups.
(B) Condensation of silanol groups with hydroxyl groups produced from epoxy groups.

(C) Addition of silanol groups to epoxy groups.
(D) Addition of hydroxyl groups to epoxy groups.
(E) Ion polymerization of epoxy groups.

Consequently, low temperatures of room temperature to about 100° C. readily permit crosslinking curing, also effecting various curing reactions almost at the same time, so that the composition is curable with a diminished difference in the degree of curing between the surface and the interior. The cured product therefore has sufficient hardness and high surface smoothness almost without shrinkage. When the macromonomer is free from hydroxyl, curing reactions wherein silanol groups participate will not readily occur inside the resin composition, whereas curing reactions in which epoxy groups participate take place to effectively cure the interior portion.

Since the resin component contains no alkoxyl group or a relatively small proportion of alkoxyl groups, the curing reactions produce reduced amounts of by-products, with the result that the cured product exhibits satisfactory properties with respect to flexural strength, bond strength, etc. Since the vaporization of chelating agent starts curing the present resin composition, the composition can be stored for a prolonged period of time with good stability when sealed off.

The present resin composition incorporates as its resin component a copolymer which comprises as a monomer component a polysiloxane macromonomer. This macromonomer has a main skeleton of siloxane bond having an aliphatic hydrocarbon group, phenyl, hydroxyl, alkoxyl, polymerizable unsaturated bond, etc. directly or indirectly attached to Si of the siloxane bond. The macromonomer can be obtained by reacting a compound (A) represented by the formula

   (I)

wherein $R_1$, $R_2$, $R_3$ and $R_4$ are as defined above with a compound (B) represented by the formula

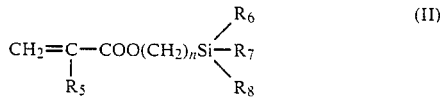   (II)

wherein $R_5$, $R_6$, $R_7$, $R_8$ and n are as defined above.

In the above formula (I) representing the compound (A), $R_1$ is an aliphatic hydrocarbon group having 1 to 8 carbon atoms or phenyl, and $R_2$, $R_3$ and $R_4$ are each alkoxyl having 1 to 4 carbon atoms or hydroxyl. $R_2$, $R_3$ and $R_4$ may all be the same or different, or at least one of them may be different from the others.

In the compound (A), examples of alkoxyl groups having 1 to 4 carbon atoms are straight-chain or branched groups such as methoxy, ethoxy, propoxy, butoxy and the like. Examples of aliphatic hydrocarbon groups are methyl, ethyl, propyl, butyl, pentyl, hexyl, heptyl, octyl and the like which are straight-chain or branched groups. Methyl and phenyl are especially desirable as $R_1$ in the compound (A). Preferable as $R_2$, $R_3$ and $R_4$ are methoxy, ethoxy, propoxy, butoxy and hydroxyl. Examples of preferred compounds (A) are methyltrimethoxysilane, phenyltrimethoxysilane, butyltrimethoxysilane, methyltriethoxysilane, methyltributoxysilane, phenyltrisilanol, methyltrisilanol and the like, among which methyltrimethoxysilane, phenyltrimethoxysilane and phenyltrisilanol are especially desirable. These compounds can be used singly or in combination.

In the above compound (B), $R_5$ represents a hydrogen atom or methyl, and $R_6$, $R_7$ and $R_8$ are each hydroxyl, alkoxyl having 1 to 4 carbon atoms or an aliphatic hydrocarbon group having 1 to 8 carbon atoms. n is an integer of 1 to 6. $R_6$, $R_7$ and $R_8$ may all be the same or different, or at least one of them may be different from the others. However, at least one of them is hydroxyl or alkoxyl.

In the compound (B), examples of aliphatic hydrocarbon groups having 1 to 8 carbon atoms, as well as alkoxyl groups having 1 to 4 carbon atoms, can be those exemplified for the compound (A). Methoxy, ethoxy and hydroxyl groups are especially desirable as $R_6$, $R_7$ and $R_8$, and n is preferably in the range of from 2 to 4. Examples of preferable compounds (B) are γ-acryloxyethyltriethoxysilane, γ-methacryloxyethyltriethoxysilane, γ-methacryloxypropyltrimethoxysilane, γ-methacryloxypropyltriethoxysilane, γ-acryloxypropyltrimethoxysilane, γ-methacryloxybutyltriethoxysilane, γ-acryloxypropyltrisilanol and the like. More preferable among these examples are γ-acryloxyethyltriethoxysilane, γ-methacryloxyethyltriethoxysilane, γ-methacryloxypropyltrimethoxysilane, γ-methacryloxypropyltriethoxysilane and γ-acryloxypropyltrisilanol. These compounds can be used singly or in combination.

According to the present invention, the polysiloxane macromonomer can be prepared by reacting the compound (A) with the compound (B). The proportions of the two compounds, based on the combined amount thereof, are 70 to 99.999 mole %, preferably 90 to 99.9 mole %, more preferably 95 to 99 mole %, of the compound (A), and 30 to 0.001 mole %, preferably 10 to 0.1 mole %, more preferably 5 to 1 mole %, of the compound (B). If the amount of the compound (A) is less than 70 mole %, the mixture is liable to gel during the copolymerization reaction, whereas if it is larger than 99.999 mole %, the amount of uncopolymerized polysiloxane increases to render the resin solution turbid, hence undesirable.

The reaction between the compounds (A) and (B) is effected by the dehydration condensation of the hydroxyl groups contained in these compounds and/or the hydroxyl groups resulting from the hydrolysis of the alkoxyl groups of the compounds. Depending on the reaction conditions, the reaction involves dealcoholization in addition to the dehydration reaction.

Although the reaction can be carried out in the absence of solvent, it is desirable to conduct the reaction in water and/or an organic solvent wherein both the compounds (A) and (B) are soluble. Examples of desirable organic solvents are hydrocarbon solvents such as heptane, toluene, xylene, octane and mineral spirit, ester solvents such as ethyl acetate, n-butyl acetate, isobutyl acetate, methyl cellosolve acetate and butylcarbitol acetate, ketone solvents such as methyl ethyl ketone, methyl isobutyl ketone and diisobutyl ketone, alcoholic solvents such as ethanol, isopropanol, n-butanol, sec-butanol and isobutanol, ether solvents such as n-butyl ether, dioxane, ethylene glycol monomethyl ether and ethylene glycol monoethyl ether, and the like. These solvents are usable singly or in combination.

When the compounds (A) and (B) are used in the form of a solution, the combined concentration of these compounds in the solution is suitably at least 5 wt. %.

According to the invention, the compounds (A) and (B) are reacted suitably at a temperature of about 20 to about 180° C., preferably about 50° to about 120° C. The reaction time is suitably about 1 to about 40 hours usually.

When required, the reaction may be carried out in the presence of a polymerization inhibitor, which is effective for preventing the polymerization reaction due to unsaturated bonds in the compound (B). Examples of useful inhibitors are hydroquinone, hydroquinone monomethyl ether and like quinone compounds.

The reaction system of compounds (A) and (B) for preparing the polysiloxane macromonomer may have incorporated therein tetraalkoxysilane, dialkyldialkoxysilane or the like, which can be used in an amount of up to about 20 mole % based on the combined amount of the compounds (A) and (B).

When $R_2$, $R_3$, $R_4$, $R_6$, $R_7$ and $R_8$ in the compounds (A) and (B) are all hydroxyl, it is desirable to conduct the reaction in an organic solvent with heating and stirring for dehydration condensation.

Further when at least one of the compounds (A) and (B) has alkoxyl attached to Si, it is desired to effect hydrolysis before condensation. It is required to conduct hydrolysis when all of $R_2$, $R_3$, $R_4$, $R_6$, $R_7$ and $R_8$ are alkoxyl. The hydrolysis reaction and the condensation reaction can be carried out continuously in the presence of water and a catalyst with heating and stirring. The amount of water to be used for these reactions, although not limited specifically, is preferably at least about 0.1 mole per mole of alkoxyl. With less than about 0.1 mole of water present, the two compounds are likely to become lower in reactivity. It is most preferable to use a large excess of water. In the case where the condensation reaction produces an alcohol which is sparingly soluble in water, the use of water and a water-soluble organic solvent in combination serves to render the reaction system uniform. Desirable for use as water-soluble organic solvents are the aforementioned alcoholic, ester, ether and ketone solvents. Acids or alkali catalysts are usable as catalysts for the hydrolysis reaction. Examples of useful acid catalysts are hydrochloric acid, sulfuric acid, phosphoric acid, formic acid, acetic acid, propionic acid, acrylic acid, methacrylic acid and the like. Examples of useful alkali catalysts are sodium hydroxide, triethylamine, ammonia and the like. It is suitable to use the catalyst in an amount of about 0.0001 to about 5 wt. %, preferably about 0.01 to about 0.1 wt. %, based on the combined amount of the compounds (A) and (B).

The polysiloxane macromonomer to be used in this invention is about 400 to about 100,000, preferably about 1000 to about 20,000, in number average molecular weight. If this value is less than about 400, the copolymerization reaction system tends to gel, whereas values exceeding about 100,000 is likely to result in impaired compatibility, hence undesirable.

The main skeleton of the polysiloxane macromonomer afforded by the reaction of the compounds (A) and (B) in the present invention comprises a siloxane bond. The main skeleton primarily has a linear structure, ladder structure or a structure in the form of a combination of these structures. It is desirable to use a macromonomer of ladder structure, or a macromonomer of combination structure having a larger proportion of ladder structure, from the viewpoint of resistance to water, heat and light. The structure of the macromonomer can be selectively determined as desired according to the ratio between the compound (A) and the compound (B), the amounts of water and acid catalyst, etc. The polysiloxane macromonomer has a structure wherein the Si of the siloxane bond has attached thereto groups such as $R_1$ to $R_4$, $R_6$ to $R_8$, a group of the formula

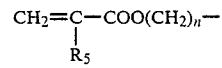

or the like. The macromonomer has as attached to the Si at least two functions groups per molecule which groups are selected from hydroxyl and alkoxyl. These groups form a silanol group or alkoxysilane group.

It is further desired that the polysiloxane macromonomer have on the average 0.2 to 1.9, preferably 0.6 to 1.4, more preferably 0.9 to 1.2, polymerizable unsaturated bonds. With a very small quantity of polymerizable unsaturated bonds present, the copolymerization reaction product is liable to become turbid, whereas when having an excess of such bonds, the macromonomer is likely to gel during the reaction, hence undesirable.

The number of unsaturated bonds in the macromonomer can be determined by the following method.

(1) Various polysiloxane macromonomers are prepared by reacting the compound (A) with the compound (B) in suitably varying ratios.

(2) A monomer having only a polymerizable unsaturated bond portion both of which contain ethylenically unsaturated group as a portion reactive with the above macromonomers is reacted with macromonomer in varying ratios to obtain various vinyl copolymers. Examples of such unsaturated monomers which can be used are styrene, vinyltoluene, acrylonitrile, an ester of acrylic acid or methacrylic acid with a monovalent alcohol, and the like.

(3) The molecular weight distributions of the resulting vinyl copolymers are determined by gel permeation chromatography (G.P.C.).

(4) When the copolymers obtained using the macromonomer and the nonfunctional monomer in varying ratios are approximately identical in peak molecular weight (molecular weight for the highest content) and have a distribution curves with a single peak, free from low-molecular-weight components (macromonomers free from unsaturated bond) or high-molecular-weight components (copolymers of macromonomer having at least two unsaturated bonds), the macromonomer used can then be interpreted as having one polymerizable unsaturated bond per molecule on the average.

(5) The average number of polymerizable unsaturated bonds in the other macromonomers can be given by $$\frac{[B]/[A]}{[B_1]/[A_1]}$$

wherein [A] is the mole number of the compound (A) used, [B] is the mole number of the compound (B) used, and [$A_1$] and [$B_1$] are the mole numbers of the compound (A) and the compound (B), respectively, used for giving the macromonomer having one polymerizable unsaturated bond on the average.

For example, it is assumed the molar ratio of compound (B)/compound (A)=1/20 affords a macromonomer having one polymerizable unsaturated bond. The molar ratio of compound (B)/compound (A)=0.9/20 then gives a macromonomer having 0.9 polymerizable unsaturated bond on the average.

The other monomer component of the copolymer to be used in the present invention, i.e., the epoxy-containing, olefinically unsaturated, monomer (alicyclic epoxy-containing unsaturated monomer) having the group

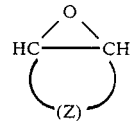

wherein (Z) has the same meaning as above at the terminal end is preferably an unsaturated having epoxy, $\alpha,\beta$-unsaturated polymerizable bond and carbonyl which are each at least one in number. More preferable is such an unsaturated monomer wherein the $\alpha,\beta$-unsaturated polymerizable bond is conjugated with the double bond of the carbonyl group. Examples of preferred alicyclic epoxy-containing monomers are those represented by the following formulae (III) to (XVII).

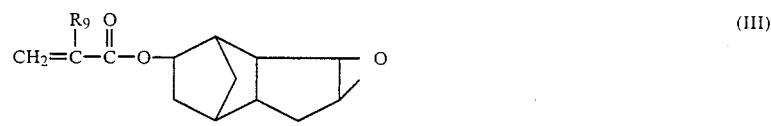 (III)

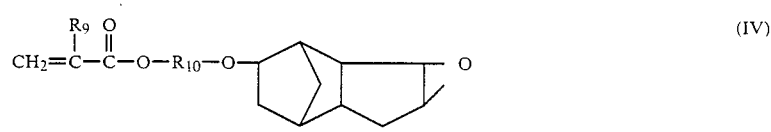 (IV)

 (V)

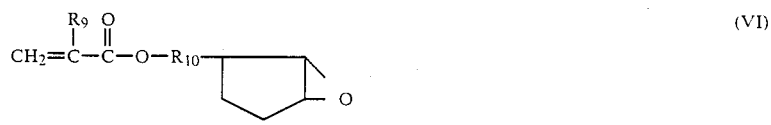 (VI)

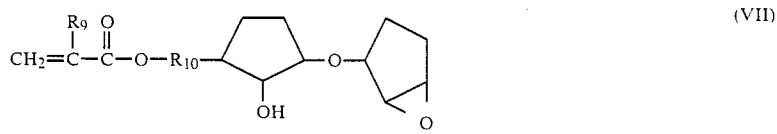 (VII)

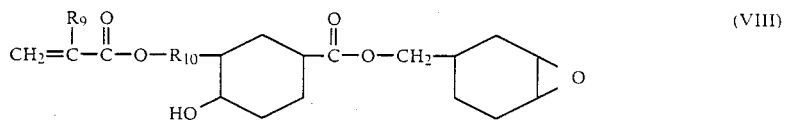 (VIII)

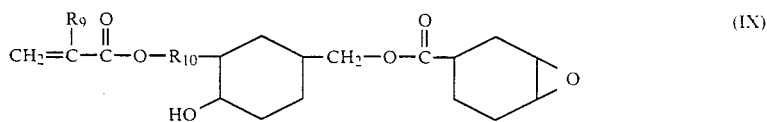 (IX)

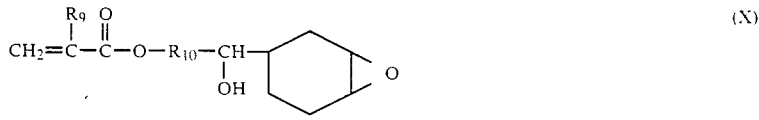 (X)

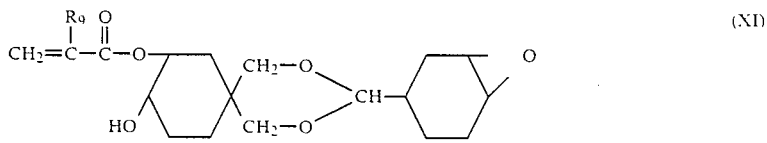 (XI)

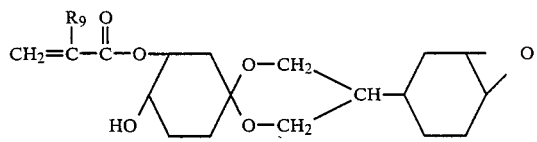 (XII)

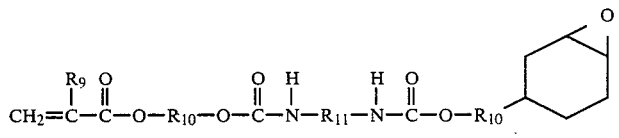 (XIII)

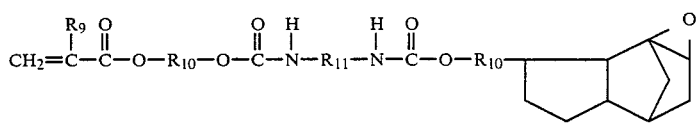 (XIV)

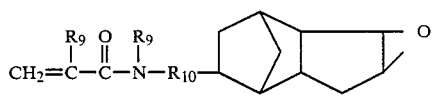 (XV)

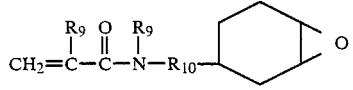 (XVI)

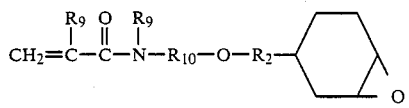 (XVII)

In the above formulae, $R_9$ is a hydrogen atom or methyl, $R_{10}$ is a bivalent aliphatic saturated hydrocarbon group having 1 to 6 carbon atoms, and $R_{11}$ is a bivalent hydrocarbon group having 1 to 10 carbon atoms.

The alicyclic epoxy-containing monomers represented by the formulae (III) to (XVII) ar desirable in view of curability.

Examples of bivalent aliphatic saturated hydrocarbon groups $R_{10}$ having 1 to 6 carbons are methylene, ethylene, propylene, tetramethylene, ethylethylene, pentamethylene, hexamethylene and the like. Examples of bivalent hydrocarbon groups $R_{11}$ having 1 to 10 carbon atoms are methylene, ethylene, propylene, tetramethylene, ethylethylene, pentamethylene, hexamethylene, polymethylene, phenylene,

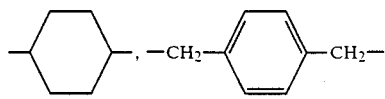

and the like.

The resin component of the present resin composition is a copolymer which comprises the polysiloxane macromonomer and alicyclic epoxy-containing unsaturated monomer as its monomer components. When required, the copolymer can be one further comprising other polymerizable olefinically unsaturated monomers as another monomer component in addition to the above monomer components.

Such other polymerizable monomers can be selected from among a wide variety of monomer in accordance with the desired properties. Typical examples of such other monomers are as follows.

(a) Esters of acrylic acid or methacrylic acid $C_1$ to $C_{18}$ alkyl esters of acrylic acid or methacrylic acid such as methyl acrylate, ethyl acrylate, propyl acrylate, isopropyl acrylate, butyl acrylate, hexyl acrylate, octyl acrylate, lauryl acrylate, methyl methacrylate, ethyl methacrylate, propyl methacrylate, isopropyl methacrylate, butyl methacrylate, hexyl methacrylate, octyl methacrylate and lauryl methacrylate; $C_2$ to $C_{18}$ alkoxyalkyl esters of acrylic acid or methacrylic acid such as methoxybutyl acrylate, methoxybutyl methacrylate, methoxyethyl acrylate, methoxyethyl methacrylate, ethoxybutyl acrylate and ethoxybutyl methacrylate; $C_2$ to $C_8$ alkenyl esters of acrylic acid or methacrylic acid such as allyl acrylate and allyl methacrylate; $C_2$ to $C_8$ hydroxyalkyl esters of acrylic acid or methacrylic acid such as hydroxyethyl acrylate, hydroxyethyl methacrylate, hydroxypropyl acrylate and hydroxypropyl methacrylate; and $C_3$ to $C_{18}$ alkenyloxyalkyl esters of acrylic acid or methacrylic acid such as allyloxyethyl acrylate and allyloxyethyl methacrylate.

(b) Olefinically unsaturated aromatic compounds

Styrene, α-methylstyrene, vinyltoluene and p-chlorostyrene.

(c) Polyolefinic compounds

Butadiene, isoprene and chloroprene.

(d) Others

Acrylonitrile, methacrylonitrile, methyl isopropenyl ketone, vinyl acetate, Veova monomer (product of Shell Chemical), vinyl propionate, vinyl pivalate, etc.

Among the above examples of other polymerizable unsaturated monomers, the hydroxyalkyl ester of acrylic acid or methacrylic acid, when used, afford improved curability.

The monomers used for preparing the copolymer to be used for the resin composition of the invention are used in the following amounts. When the copolymer is composed of two components, i.e. polysiloxane macromonomer and alicyclic epoxy-containing olefinically unsaturated monomer, 0.01 to 98 wt. % of the former and 99.99 to 2 wt. % of the latter, preferably 0.1 to 80 wt. % of the former and 99.9 to 20 wt. % of the latter, are used. If the amount of polysiloxane macromonomer used is smaller than this range, reduced curability tends to result, whereas amounts exceeding this range are undesirable since the cured product then exhibits impaired properties and is liable to shrinkage.

Further when other polymerizable unsaturated monomer is used in addition to the above two kinds of monomers 0.01 to 80 wt. % of polysiloxane macromonomer, 1 to 90 wt. % of alicyclic epoxy-containing monomer and up to 98.99 wt. % of other polymerizable monomer are used. More preferably, 0.1 to 60 wt. % of polysiloxane macromonomer, 3 to 60 wt. % of alicyclic epoxy-containing monomer and 10 to 96.9 wt. % of other polymerizable monomer are used. It is undesirable to use the macromonomer and the alicyclic epoxy-containing monomer in amounts outside the above ranges for the same reasons as given above.

In the resin composition of the present invention, the alicyclic epoxy-containing vinyl monomer may partially be replaced by an olefinically unsaturated monomer represented by the formula (XVIII)

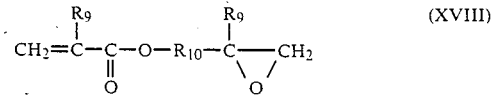

wherein $R_9$ and $R_{10}$ are as defined above. The monomer of the formula (XVIII) can be used in an amount of up to about 90 wt. %, preferably up to about 50 wt. %, based on the combined amount of the alicyclic epoxy-containing monomer and the monomer of the formula (XVIII).

The copolymer can be prepared by the same process and under the same conditions as usually used for preparing acrylic resins or vinyl resins. For example, the copolymer can be prepared by dissolving or dispersing the monomer components in an organic solvent and heating the solution or dispersion at a temperature of about 60° to 80° C. with stirring in the presence of a radical polymerization initiator. The reaction is conducted usually for about 1 to about 10 hours. Examples of useful organic solvents are those exemplified already, including alcohol solvents, ether solvents, ester solvents, hydrocarbon solvents and the like. The hydrocarbon solvent, when to be used, is used preferably in combination with other solvents in view of solubility. The radical polymerization initiator can be any of those generally used. Examples of such initiators are benzoyl peroxide, t-butylperoxy-2-ethyl hexanoate and like peroxides, azoisobutyronitrile, azobisdimethylvaleronitrile and like azo compounds.

Preferably, the copolymer is about 3000 to about 200,000, more preferably about 10,000 to about 80,000, in number average molecular weight.

The present resin composition comprises the vinyl copolymer prepared from the above-mentioned polysilosane macromonomer and alicyclic epoxy-containing monomer as its monomer components, and a 6-coordinate organoaluminum chelate compound and/or an 8-coordinate organozirconium chelate compound serving as crosslinking curing agent(s).

The 6-coordinate organoaluminum chelate compound is preferably one obtained by treating organoaluminum with a chelating agent. Suitable organoaluminums are compounds represented by the formula

wherein $R_{12}$, $R_{13}$ and $R_{14}$ are each alkoxyl having 1 to 13 carbon atoms, alkoxyalkoxyl having 3 to 10 carbon atoms, alkyl having 1 to 6 carbon atoms, aryl, alkenyl or mercapto- or amino-substituted alkyl having 1 to 6 carbon atoms, at least one of $R_{12}$, $R_{13}$ and $R_{14}$ being alkoxyl or alkoxyalkoxyl. Examples of alkoxyl groups having 1 to 13 carbon atoms for the organoaluminum compounds are methoxy, ethoxy, n-propoxy, isopropoxy, n-butoxy, isobutoxy, secbutoxy, tert-butoxy, n-pentoxy, isoamyloxy, n-hexyloxy, n-heptyloxy, n-octyloxy and the like. Examples of alkoxyalkoxyl groups having 3 to 10 carbon atoms are methoxymethoxy, methoxyethoxy, ethoxybutoxy, butoxypentoxy and the like. Examples of alkyl groups having 1 to 6 carbon atoms are methyl, ethyl, n-propyl, isopropyl, n-butyl, isobutyl, sec-butyl, tert-butyl, amyl and the like. Examples of aryl groups are phenyl, toluyl and the like. Examples of alkenyl groups are vinyl, allyl and the like. Examples of mercapto- or amino-substituted alkyl groups having 1 to 6 carbon atom are γ-mercaptopropyl, aminoethyl, aminopropyl, aminobutyl and the like.

Examples of preferred organoaluminum compounds are aluminum isopropylate, aluminum sec-butylate, aluminum tert-butylate and the like.

Examples of useful chelating agents to be reacted with such organoaluminums are lower alkanolamines (such as triethanolamine, diethanolamine and dimethylamino ethanol), acetoacetates (such as methyl acetoacetate and ethyl acetoacetate), diketone alcohols (such as diacetone alcohol), diketones (such as acetylacetone), glycols (such as ethylene glycol and octylene glycol), hydroxycarboxylic acids (such as lactic acid and tartaric acid), dicarboxylic acids or esters thereof (such as maleic acid and ethyl malonate), salicylic acid, catechol, pyrogallol, etc. Among these examples, lower alkanolamines, hydroxycarboxylic acids and diketones are preferable.

The organoaluminum chelate compound to be advantageously used in the present invention is a compound wherein neither hydroxyl nor alkoxyl is attached directly to the aluminum atom. When the aluminum chelate compound has hydroxyl or alkoxyl directly attached to the aluminum atom, the resin composition containing the chelate compound has low storage stability and gives coatings which have poor surface smoothness when cured.

Examples of preferred 6-coordinate organoaluminum chelate compounds are aluminum tris(ethyl acetoacetate), tris(trifluoroacetylacetonato)aluminum, tris(hexafluoroacetylacetonato)aluminum, tris(ethylacetoacetato)aluminum, tris(n-propylacetoacetato)aluminum, tris(isopropylacetoacetato)aluminum, tris(n-butylacetoacetato)aluminum, tris(salicylaldehydolato)aluminum, tris(2-ethoxycarbonyl phenolate)aluminum, tris(acetylacetonato)aluminum, tris(ethylacetonato)aluminum and the like. These compounds may be those partially condensed.

Suitable 8-coordinate organozirconium chelate compounds are those prepared by treating organozirconium with a chelating agent. Suitable organozirconiums are compounds represented by the formula

wherein $R_{15}$, $R_{16}$, $R_{17}$ and $R_{18}$ are each alkoxyl having 1 to 13 carbon atoms, alkoxyalkoxyl having 3 to 10 carbon atoms, alkyl having 1 to 6 carbons, aryl, alkenyl or a mercapto- or amino-substituted alkyl having 1 to 6 carbon atoms, at least two of $R_{15}$, $R_{16}$, $R_{17}$ and $R_{18}$ being alkoxyl and/or alkoxyalkoxyl.

Examples of the groups represented by $R_{15}$ to $R_{18}$ are the same as those exemplified above for the groups $R_{12}$ to $R_{14}$ of organoaluminum compounds.

Examples of preferred organozirconium compounds are tetramethyl zirconate, tetraethyl zirconate, tetraisopropyl zirconate, tetra-n-butyl zirconate, tetraisobutyl zirconate, tetra-tert-butyl zirconate, etc.

Suitable chelating agents to be reacted with such organozirconium compounds are those already exemplified for the aluminum compounds.

The organozirconium chelate compound to be advantageously used in the present invention is a compound wherein neither hydroxyl nor alkoxyl is attached directly to the zirconium atom. When the zirconium chelate compound has hydroxyl or alkoxyl directly attached to the zirconium atom, the resin composition containing the compound exhibits impaired storage stability and gives coatings of poor smoothness when cured, so that such compound is not desirable.

Examples of preferred 8-coordinate organozirconium chelate compounds are tetrakis(oxalic acid)zirconium, tetrakis(acetylacetone)zirconium, tetrakis(n-propylacetoacetato)zirconium, tetrakis(ethylacetoacetato)zirconium, tetrakis(salicylaldehydato)zirconium, etc. Such compounds can be partially condensed ones.

The present resin composition comprises the 6-coordinate organoaluminum chelate compound and/or 8-coordinate organozirocnium chelate compound serving as crosslinking curing agent(s) in an amount of 0.01 to 30 parts by weight, preferably 0.1 to 15 parts by weight, per 100 parts by weight of the copolymer. When the amount of crosslinking curing agent used is smaller than this range, lower crosslinking curability tends to result, whereas when amounts exceeding this range are used, some of the agent remains in the cured product, entailing lower resistance to water, hence undesirable.

When required, it is possible to incorporate into the present resin composition an epoxy-containing resin such as Epikote 1001 (product of Shell Chemical) or a hydroxyl-containing resin such as styrene-allyl alcohol copolymer. Preferably, these resins are used in an amount of up to 10 wt. % based on the composition.

The present resin composition may be used in the form of a solution in an organic solvent as prepared in advance or immediatetly before use. Although not limitative, preferred organic solvents are those up to about 150° C. in boiling point in view of the curing velocity of the composition. Examples of preferable organic solvents are hydrocarbon solvents such as toluene and xylene, ketone solvents such as methyl ethyl ketone and methyl isobutyl ketone, ester solvents such as ethyl acetate and butyl acetate, ether solvents such as dioxane and ethylene glycol diethyl ether, alcoholic solvents such as butanol and propanol, etc. These solvents can be used singly or in a suitable combination. When alcoholic solvents are used, it is desirable to use them in combination with other solvent in view of the solubility of the resin. The resin content in the resin solution, although variable according to the contemplated use, is generally about 10 to about 70 wt. %.

The method of applying the present resin composition is not limited specifically but can be any of usual coating methods such as spray coating, roll coating and brush coating.

The resin composition of the present invention is readily curable through crosslinking at low temperatures of up to 100 °C.. For example, the composition can be fully cured at room temperature without any heating usually in about 8 hours to about 7 days. When heated at about 40 to about 100 °C., the composition can be completely cured in about 5 minutes to about 3 hours.

The curing reaction of the present composition starts with the evaporation of the solvent and is thought to proceed in the fashion of a chain reaction by virtue of the vaporization of the chelating agent from the crosslinking agent. Presumably, the crosslinking agent causes the reaction to proceed through the following mechanism. For example, when the crosslinking curing agent used is an organoaluminum chelating compound, the vaporization of the chelating agent is followed by the reaction of the organoaluminum compound with the silanol group derived from the polysiloxane macromonomer to produce the bond

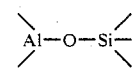

in the first stage.

Subsequently in the second stage, a coordination bond is formed between silanol and

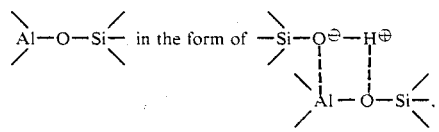

whereby the silanol is polarized. The polarized silanol reacts with an epoxy group, forming an oxonium salt as represented by

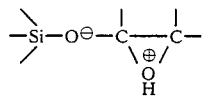

Subsequently, the ionic polymerization of epoxy groups and the addition reaction thereof with hydroxyl groups occur.

In the case of the present resin composition, the vinyl copolymer, the resin component thereof, contains silanol groups derived from the polysiloxane macromonomer, epoxy groups derived from the alicyclic epoxy-containing monomer, and other functional groups. Accordingly, besides the crosslinking reaction catalytically effected by the crosslinking curing agent as stated above, presumably various curing reactions take place concurrently, as given below.

(A) Condensation of silanol groups.
(B) Condensation of silanol groups with hydroxyl groups from epoxy groups.
(C) Addition of silanol groups to epoxy groups.
(D) Addition of hydroxyl groups to epoxy groups.
(E) Ion polymerization of epoxy groups.

With these curing reactions occurring concurrently, the resin composition can be cured at the surface and in the interior almost at the same time. This diminishes the difference in the degree of curing between the surface and the interior of the cured product, which therefore has sufficient hardness and is almost free of shrinkage.

When the polysiloxane macromonomer in the present composition contains alkoxyl groups which form alkoxysilane groups, the composition requires hydrolysis to form silanol groups. This hydrolysis reaction proceeds satisfactorily in the presence of a small amount of water, e.g. the moisture of air. The hydrolysis reaction will not readily proceed in the interior of the composition, and if the macromonomer has no silanol group, it is difficult to effect in the interior of the composition the curing reaction wherein the silanol group participates, whereas the interior portion can be fully cured by the reaction wherein epoxy groups participates.

The resin composition of the invention has the outstanding features given below.

(1) The composition can be readily cured by crosslinking at low temperatures of up to 100° C. For example, when cured at 60° C. for 30 minutes, the composition gives a cured product having a gel fraction of at least 90%.

(2) The curing reaction requires no water or proceeds in the presence of a small quantity of water, e.g. the moisture in air.

(3) The composition starts curing with the vaporiation of the chelating agent and can therefore be stored with good stability when sealed off.

(4) The composition is free from any curing agent, such as isocyanate, which is highly toxic.

(5) The condensation reaction of silanol groups, the ion polymerization reaction of epoxy groups and other curing reactions occur concurrently, consequently diminishing the difference in the degree of curing between the surface and the interior, causing no shrinkage and rendering the composition satisfactorily usable for producing coatings of increased thickness.

(6) The composition affords cured products having excellent properties, especially high resistance to weather and water, because of reduced amounts of by-products due to the curing reaction.

(7) The composition has little or no likelihood of remaining uncured in the surface layer when cured, is excellent in overcoatability and recoatability and provides cured products which are outstanding in adhesion, resistance to heat, corrosion and staining, water repellency, etc.

Because of these excellent features, the present resin composition is advantageously usable for coating motor vehicles, containers, outdoor building materials, PCM (precoat metal), etc.

The invention will be described below in greater detail with reference to examples of the invention.

EXAMPLE 1

| Example 1 | |
|---|---|
| Methyltrimethoxysilane | 2720 g |
| | (20 mols) |
| γ-Methacryloxypropyl- | 256 g |
| trimethoxysilane | (1 mol) |
| Deionized water | 1134 g |
| 60% Hydrochloric acid | 2 g |
| Hydroquinone | 1 g |

The mixture of these compounds was reacted at 80° C. for 5 hours, and the resulting polysiloxane macromonomer was separated off. The macromonomer was 2000 in number average molecular weight and had one group polymerizable unsaturated bond and four hydroxyl groups per molecule on the average.

The macromonomer (300 g) was mixed with the following compounds.

| | |
|---|---|
| Styrene | 100 g |
| (CH₂=C(CH₃)-C(=O)-O-[dicyclopentanyl epoxide]) | 100 g |
| n-Butyl acrylate | 500 g |
| Azoisobutyronitrile | 20 g |

At 120° C., the mixture was added dropwise to g of xylene and subjected to polymerization to obtain a transparent copolymer, which was about 20000 in number average molecular weight.

To the resin solution (200 g, 50% in resin content) was added 3 g of aluminum tris(ethylacetoacetate), and the mixture was applied to a glass plate to a thickness of 100 μm and baked at 60° C. for 30 minutes.

When cured, the coating was transparent and free of shrinkage. The gel fraction (acetone extraction residue: reflux temperature, 4 hours) was 93.5%.

EXAMPLE 2

| Example 2 | |
|---|---|
| Phenyltrisilanol | 7800 g |
| | (50 mols) |
| γ-Acryloxypropyltrisilanol | 200 g |
| | (1 mol) |
| Toluene | 500 g |

The mixture of these compounds was reacted at 117° C. for 3 hours, followed by dehydration to separate off the resulting polysiloxane macromonomer. This macromonomer was 7000 in number average molecular weight and had one olefinic unsaturation and 5 to 10 hydroxyl groups per molecule on the average.

The macromonomer (100 g) was mixed with the following compounds.

| | |
|---|---|
| 2-Hydroxyethyl acrylate | 100 g |
| 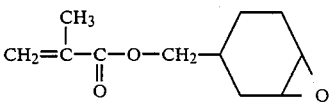 | 200 g |
| 2-Ethylhexyl methacrylate | 600 g |
| Azoisobutyronitrile | 10 g |

The mixture was added dropwise to 1000 g of butanol-xylene mixture (1:1 by weight) at 120° C. for polymerization to obtain a transparent copolymer, which was about 40,000 in number average molecular weight.

To this resin solution (200 g, resin content 50%) was added 0.3 g of tetrakis(acetylacetone)zirconium, and the mixture was applied to a glass plate to a thickness of 100 μm and baked at 60° C. for 30 minutes.

When cured, the coating was transparent and free of shrinkage. The gel fraction was 92.6%.

EXAMPLE 3

Phenyltrimethoxysilane (48 mols) was reacted with 2 moles of α-methacryloxyethyltriethoxysilane in the same manner as in Example 1. The polysiloxane macromonomer obtained was about 5000 in number average molecular weight and had one olefinic unsaturation and 5 to 10 methoxy groups per molecule on the average.

The macromonomer (500 g) was polymerized with the following compounds in the same manner as in Example 1 using 14 g of azoisobutyronitrile.

| | |
|---|---|
| Styrene | 70 g |
| Compound of the formula (VII) (wherein $R_9$ is methyl, and $R_{10}$ is ethylene) | 80 g |
| n-Butyl acrylate | 350 g |

The copolymer obtained was about 60000 in number average molecular weight.

To the resin solution (200 g, resin content 50%) was added 1.0 g of aluminum tris (acetylacetone), and the mixture was applied to a glass plate to a thickness of 100 μm and baked at 60° C. for 30 minutes.

When cured, the coating was transparent and free of shrinkage. The gel fraction was 93.1%.

EXAMPLE 4

Methyltrimethoxysilane (29.1 mols) was reacted with 0.9 mol of γ-acryloxyethyltriethoxysilane in the same manner as in Example 1. The resulting polysiloxane macromonomer was about 15,000 in number average molecular weight and had one vinyl group and 5 to 10 methoxy groups per molecule on the average.

This macromonomer (400 g) was polymerized with the following compounds in the same manner as in Example 1 using 7 g of azoisobutyronitrile.

| | |
|---|---|
| Hydroxyethyl acrylate | 70 g |
| Compound of the formula (XIII) (wherein $R_9$ is methyl, $R_{10}$ is ethylene and $R_{11}$ is hexamethylene) | 140 g |
| 2-Ethylhexyl methacrylate | 390 g |

The copolymer obtained was about 70,000 in number average molecular weight.

To this resin solution (200 g, resin content 50%) was added 10 g of tetrakis(ethylacetoacetato)zirconium, and the mixture was applied to a glass plate to a thickness of 100 μm and allowed to stand at room temperature (25° C.) for 24 hours.

When cured, the coating was transparent, free of shrinkage and 90.5% in gel fraction.

COMPARATIVE EXAMPLE 1

A solution of copolymer was prepared in the same manner as in Example 1 except that the compound of the formula

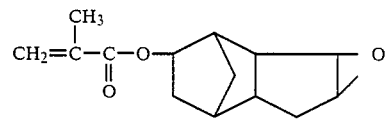

used in Example 1 was replaced by glycidyl acrylate. To this resin solution (200 g) was added 3 g of aluminum tris(ethylacetoacetate), and the mixture was applied to a glass plate to a thickness of 100 μm and baked at 100° C. for 30 minutes. When cured, the coating was transparent but exhibited some shrinkage. The gel fraction was 60.1%.

COMPARATIVE EXAMPLE 2

A solution of vinyl copolymer was prepared in the same manner as in Example 1 except that 300 g of the macromonomer of Example 1 was replaced by 300 g of methacryloxypropyltrimethoxysilane. To this resin solution (200 g) was added 3 g of aluminum tris(ethyl acetoacetate), and the mixture was applied to a glass plate to a thickness of 100 μm and baked at 100° C. for 30 minutes. When cured, the coating, although transparent, exhibited shrinkage.

We claim:

1. A resin composition curable at a low temperature and characterized in that the composition comprises:
    (a) a copolymer prepared by copolymerizing ethylenically unsaturated groups of a polysiloxane macromonomer and an epoxy-containing monomer containing at least one ethylenically unsaturated group,
    the polysiloxane macromonomer being prepared by reacting 70 to 99.999 mole % of a compound (A) represented by the formula

 (I)

wherein $R_1$ is an aliphatic hydrocarbon group having 1 to 8 carbon atoms or phenyl, and $R_2$, $R_3$ and $R_4$ are each alkoxyl having 1 to 4 carbon atoms or hydroxyl, with 30 to 0.001 mole % of a compound (B) represented by the formula

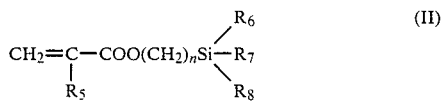

wherein $R_5$ is a hydrogen atom or methyl, $R_6$, $R_7$ and $R_8$ are each hydroxyl, alkoxyl having 1 to 4 carbon atoms or an aliphatic hydrocarbon group having 1 to 8 carbon atoms, at least one of $R_6$, $R_7$ and $R_8$ being hydroxyl or alkoxyl, and n is an integer of 1 to 6 the polysiloxane macromonomer having per molecule at least two functional groups selected from hydroxyl and the alkoxyl and being 400 to 100,000 in number average molecular weight, the epoxy-containing monomer having at its terminal end the group

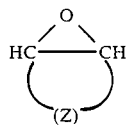

wherein (Z) forms an alicyclic group along with the C—C bond of the epoxy group, said epoxy-containing monomer containing at least one epoxy group, at least one $\alpha, \beta$-unsaturated bond and at least one carbonyl group, and (b) at least one member selected from the group consisting of a 6-coordinate organoaluminum chelate compound with neither hydroxyl or alkoxyl attached directly to the aluminum atom thereof and an 8-coordinate organozirconium chelate compound with neither hydroxyl or alkoxyl attached directly to the zirconium atom thereof.

2. A resin composition as defined in claim 1 wherein the compound (A) is at least one compound selected from the group consisting of methyltrimethoxysilane, phenyltrimethoxysilane, butyltrimethoxysilane, methyltriethoxysilane, methyltributoxysilane, phenyltrisilanol and methyltrisilanol.

3. A resin composition as defined in claim 2 wherein the compound (A) is at least one compound selected from the group consisting of methyltrimethoxysilane, phenyltrimethoxysilane and phenyltrisilanol.

4. A resin composition as defined in claim 1 wherein the compound (B) is at least one compound selected from the group consisting of γ-acryloxyethyltriethoxysilane, γ-methacryloxyethyltriethoxysilane, γ-methacryloxypropyltrimethoxysilane, γ-methacryloxypropyltriethoxysilane, γ-acryloxypropyltrimethoxysilane, γ-methacryloxybutyltriethoxysilane, and γ-acryloxypropyltrisilanol.

5. A resin composition as defined in claim 4 wherein the compound (B) is at least one compound selected from the group consisting of γ-acryloxyethyltriethoxysilane, γ-methacryloxyethyltriethoxysilane, γ-methacryloxpropyltrimethoxysilane, γ-methacryloxypropyltriethoxysilane, and γ-acryloxypropyltrisilanol.

6. A resin composition as defined in claim 1 wherein the polysiloxane macromonomer has 0.2 to 1.9 polymerizable unsaturated bonds per molecule on the average.

7. A resin composition as defined in claim 1 wherein the copolymer is prepared from 0.01 to 98 wt. % of the polysiloxane macromonomer and 99.99 to 2 wt. % of the epoxy-containing monomer.

8. A resin composition as defined in claim 1 wherein copolymer is prepared from 0.01 to 80 wt. % of the polysiloxane macromonomer, 1 to 90 wt. % of the epoxy-containing monomer and up to 98.99 wt. % of other polymerizable olefinically unsaturated monomer.

9. A resin composition as defined in claim 1 wherein the copolymer is about 3000 to about 200000 in number average molecular weight.

10. A resin composition as defined in claim 9 wherein the copolymer is about 10000 to about 80000 in number average molecular weight.

11. A resin composition as defined in claim 1 wherein the 6-coordinate organoaluminum chelate compound is at least one compound selected from the group consisting of aluminum tris(ethyl acetoacetate), tris(trifluoroacetylacetonato)aluminum, tris(hexafluoroacetylacetonato)aluminum, tris(ethylacetoacetato)aluminum, tris(n-propylacetoacetato)aluminum, tris(isopropylacetoacetato)aluminum, tris(n-butylacetoacetato)aluminum, tris(salicylaldehydato)aluminum, tris(2-ethoxycarbonyl phenolate)aluminum, tris(acetylacetonato)aluminum and tris(ethylacetonato)aluminum.

12. A resin composition as defined in claim 1 wherein the 8-coordinate organozirconium chelate compound is at least one compound selected from the group consisting of tetrakis(oxalic acid)zirconium, tetrakis(acetylacetone)zirconium, tetrakis(n-propylacetoacetato)zirconium, tetrakis(ethylacetoacetato)zirconium and tetakis(salicylaldehydato)zirconium.

13. A resin composition as defined in claim 1 which comprises 0.01 to 30 parts by weight of the 6-coordinate organoaluminum chelate compound, the 8-coordinate organozirconium chelate compound, or a mixture thereof, per 100 parts by weight of the copolymer.

14. A resin composition as defined in claim 13 which comprises 0.1 to 15 parts by weight of the 6-coordinate organozirconium chelate compound, the 8-coordinate organozirconium chelate compound, or a mixture thereof, per 100 parts by weight of the copolymer.

* * * * *